Aug. 25, 1959 W. H. ROBINSON 2,901,140

DUAL-PURPOSE CLOSURE MEMBERS

Filed Oct. 7, 1955 5 Sheets-Sheet 1

INVENTOR.
WILLIAM H. ROBINSON
BY Irvin V. Gleim
ATTORNEY.

DUAL-PURPOSE CLOSURE MEMBERS

Filed Oct. 7, 1955

INVENTOR.
WILLIAM H. ROBINSON
BY
ATTORNEY.

Aug. 25, 1959 W. H. ROBINSON 2,901,140

DUAL-PURPOSE CLOSURE MEMBERS

Filed Oct. 7, 1955 5 Sheets-Sheet 3

INVENTOR.
WILLIAM H. ROBINSON
BY [signature]
ATTORNEY

INVENTOR.
WILLIAM H. ROBINSON
BY Irwin V. Gleim
ATTORNEY.

INVENTOR.
WILLIAM H. ROBINSON
BY [signature]
ATTORNEY.

United States Patent Office 2,901,140

Patented Aug. 25, 1959

2,901,140

DUAL-PURPOSE CLOSURE MEMBERS

William H. Robinson, Miamisburg, Ohio

Application October 7, 1955, Serial No. 539,104

5 Claims. (Cl. 215—41)

Figure 1:
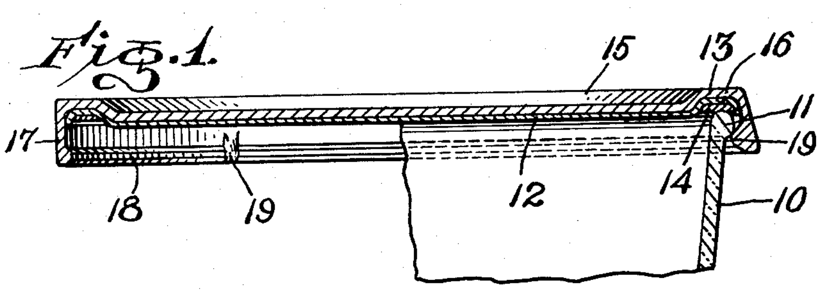

This invention relates to dual-purpose closure members and it consists in the combinations, constructions and arrangements of parts herein described and claimed. More particularly, this invention relates to types of dual-purpose closures which are especially suitable for vacuum sealing of containers and for effective and easy resealing of containers for re-use after the original vacuum seal has been broken.

The requirements imposed to effect a commercially satisfactory and highly suitably dual-purpose closure have not hitherto been attained. Difficult initial removal of the closure from a container, assurance against dislodgment during handling and storage, protection of contents in a container against tampering while concomitantly affording an effective seal with easy reinstallation of the closure on the container for re-use after the original seal has been broken, are examplary of such requirements. Presently available closures consist of a metal cap and gasket to be sealed upon a vessel such as a glass jar. The metal cap is of the type which is pressed on the vessel to effect a hermetic sealing but after the initial seal has been ruptured, the cap after ordinary removal is not generally capable of properly or effectively resealing the vessel for re-use.

Now, I have discovered dual-purpose closure members which synergistically attain the above noted requirements. In general and in accordance with my invention, there is provided several forms of dual-purpose closure members each of which essentially consists of a rigid disc portion which is held in position upon a container by means of vacuum within the container in conventional manner and a second portion which is preferably formed of polyethylene, vinyl plastic, rubber or the like and which is flexible and stretchable. The two portions of the closure member may be placed upon the container when the same is packed and when the consumer is ready to open the container, the devices of the present invention are of such nature that the flexible member may be easily and readily removed, whereupon the rigid member may be punctured or pried off the container in customary manner and discarded, whereupon the flexible member may be utilized to again seal the container. The rigid member provides the necessary strength for maintaining a vacuum within the container without appreciable deflection while the flexible portion may be utilized thereafter as a sealing cover, each of the various forms of flexible portions being provided with novel sealing means. In one form of the invention there is additionally provided a novel means for breaking the vacuum within the container. The invention in its various forms provides a satisfactory sealing cover for containers after the vacuum has been broken in removing the rigid portion of the closure member.

It is accordingly an object of the invention to provide a novel dual-purpose closure member.

Another object of the invention is to provide, in a device of the character set forth, novel means for maintaining a vacuum in a container while at the same time providing means for re-sealing the container.

Another object of the invention is to provide, in device of the character set forth, novel means for breaking a vacuum in a container.

Still another object of the invention is to provide means, in a closure member, for sealing and for resealing a container upon which the same may be mounted.

Still another object of the invention is to provide a novel combined rigid and flexible closure member for containers.

Figure 2:
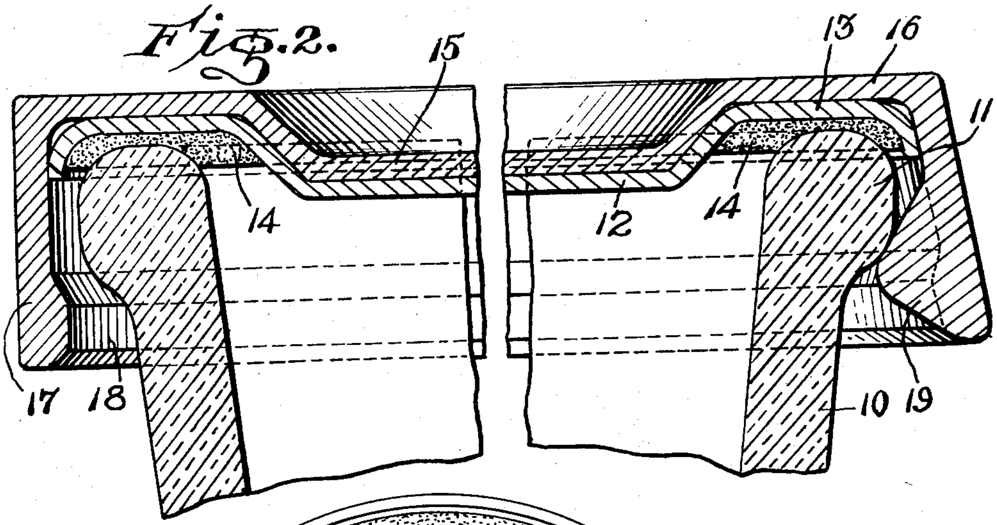
Figure 3:
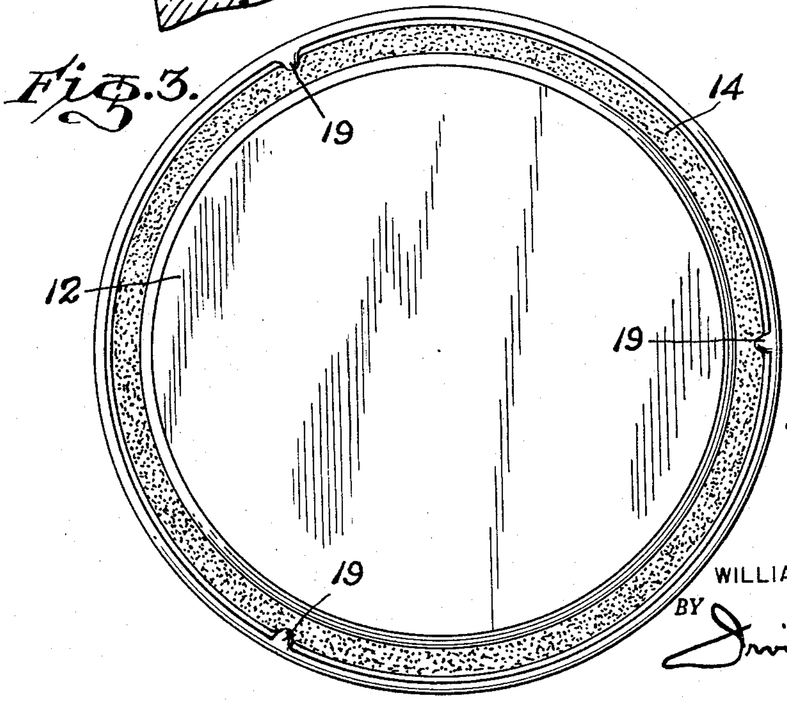
Figure 4:
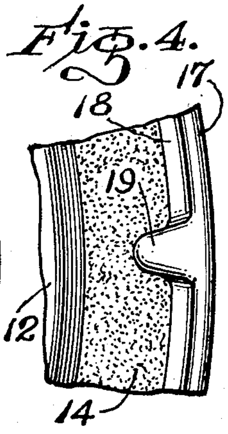
Figures 5, 6:
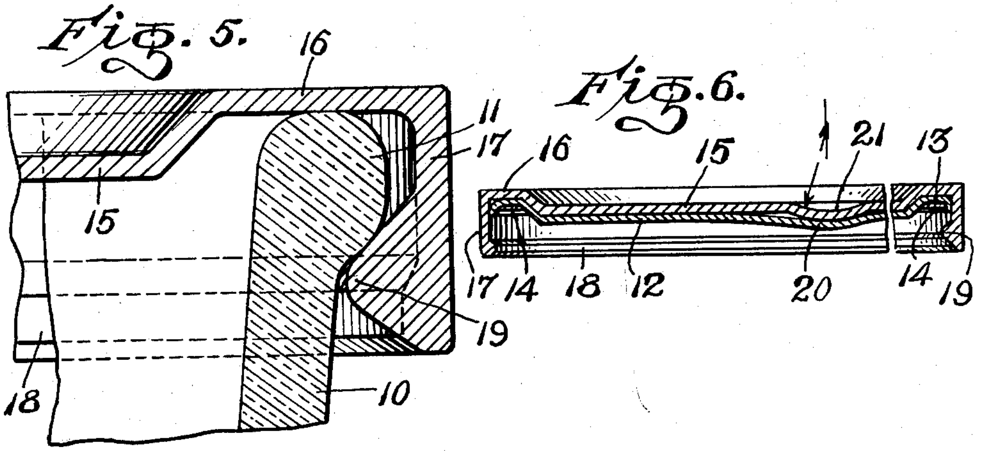
Figure 7:
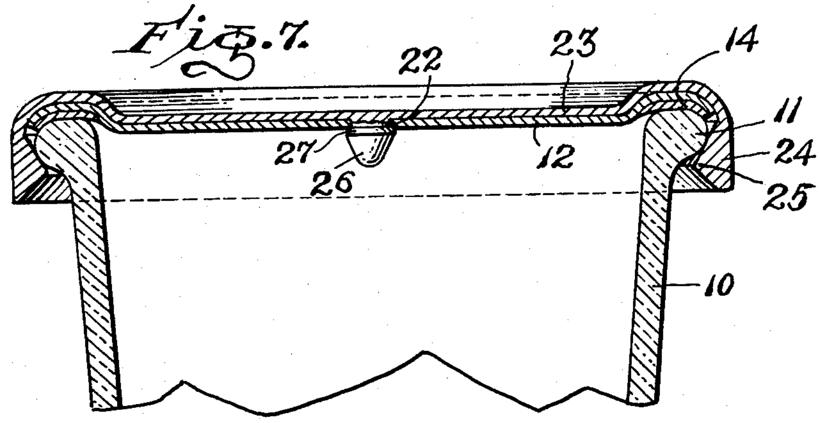
Figure 8:
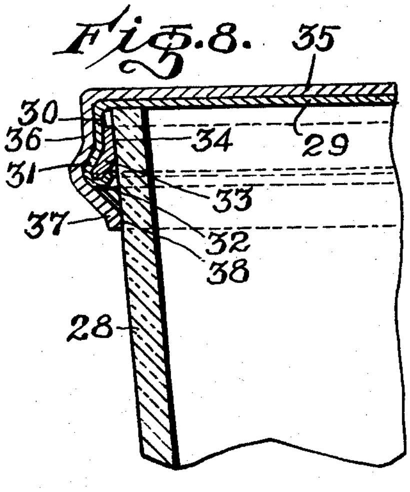
Figure 11:
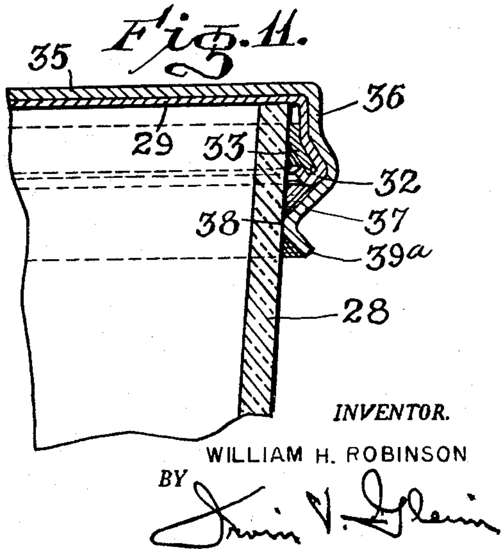
Figure 9:
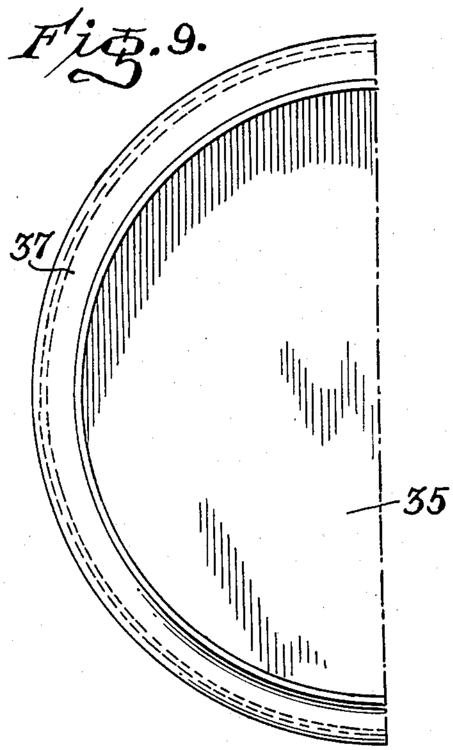
Figure 10:
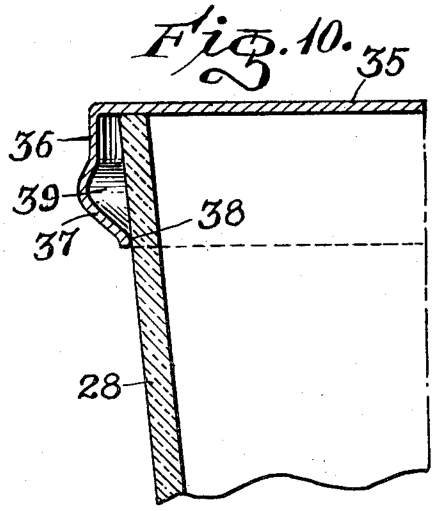
Figure 12:
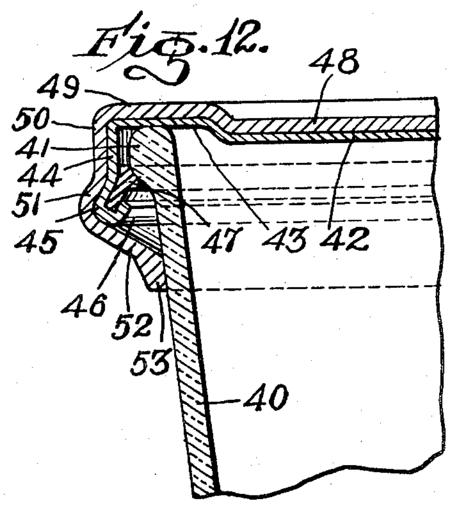
Figure 13:
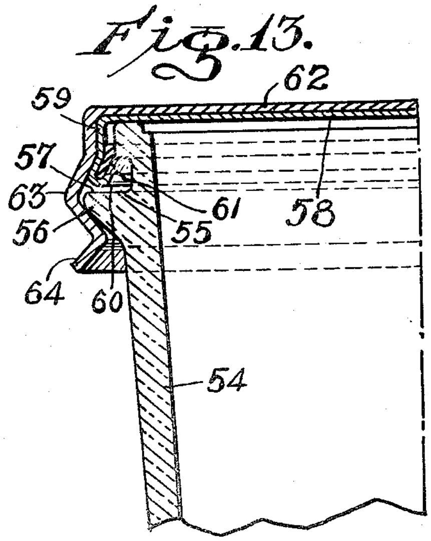
Figure 14:
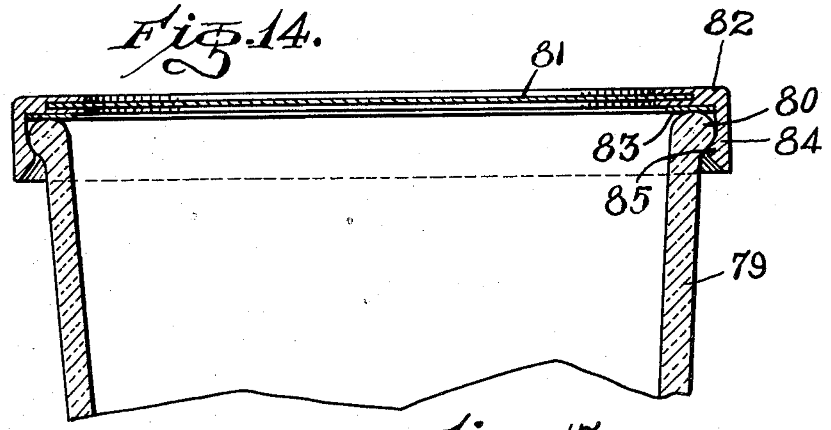
Figures 15, 16, 17:
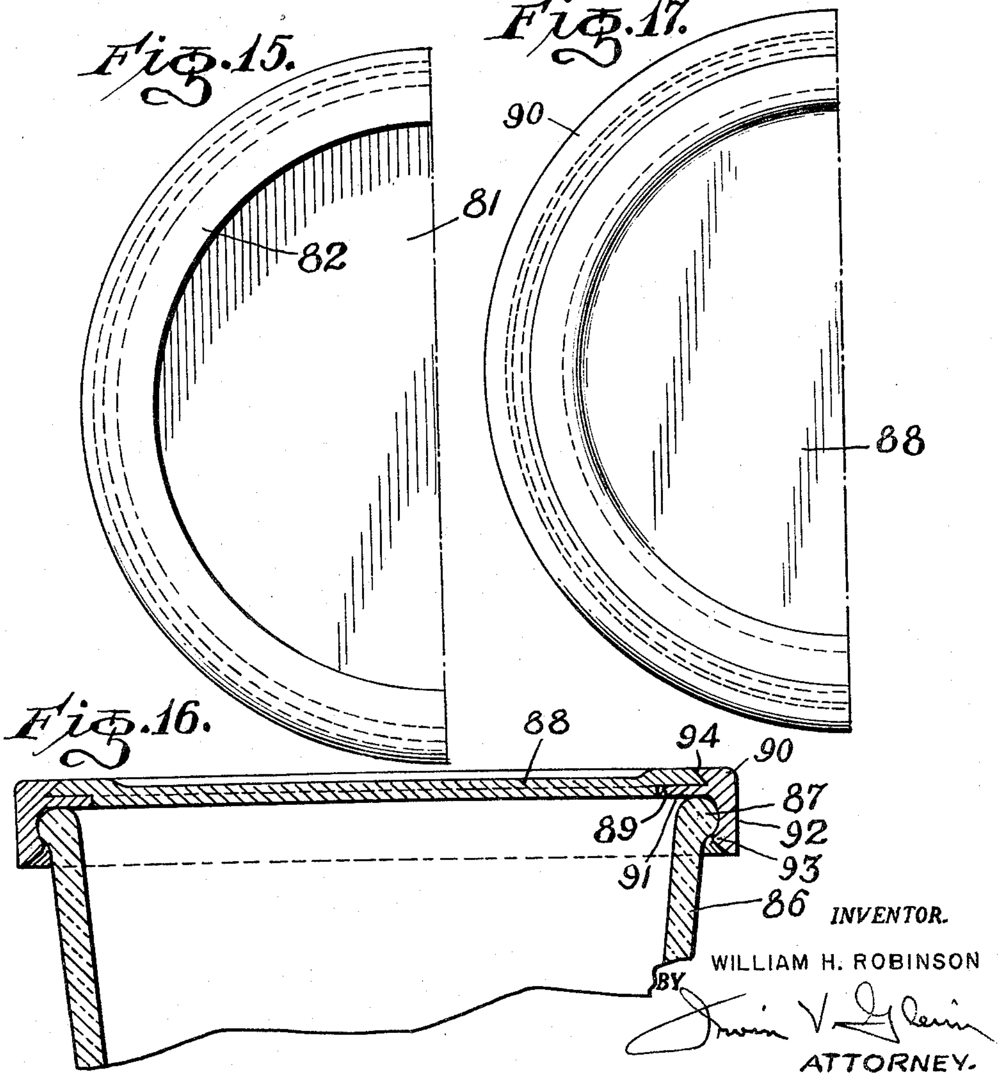
Figure 18:
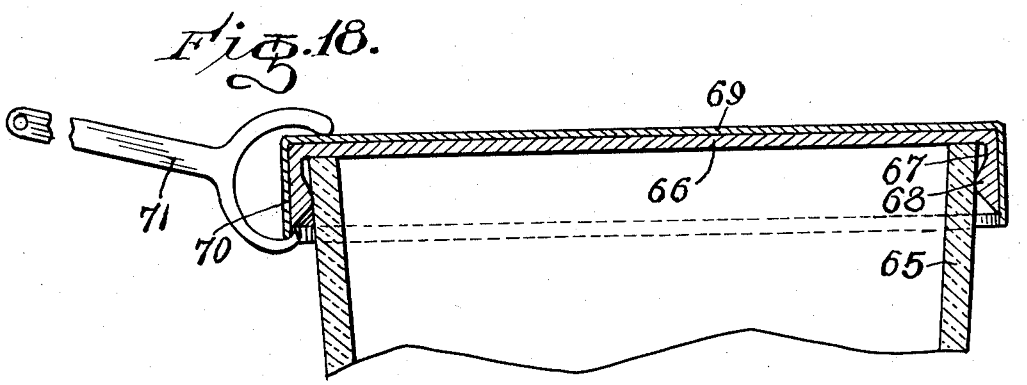
Figure 19:
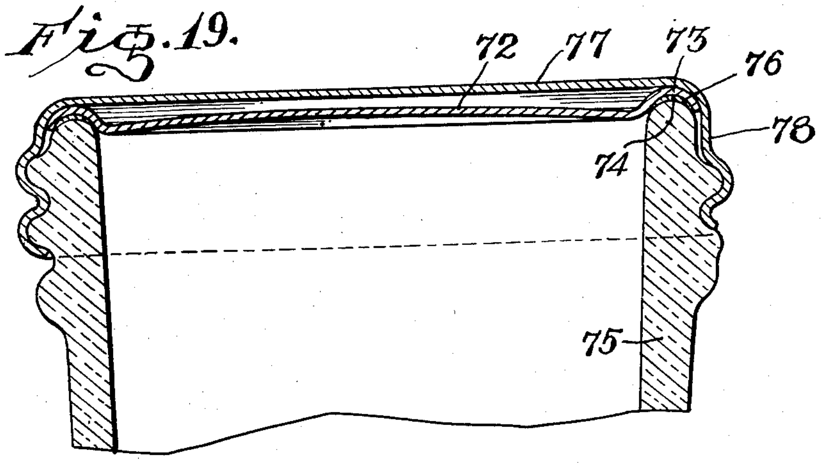
Figure 20:
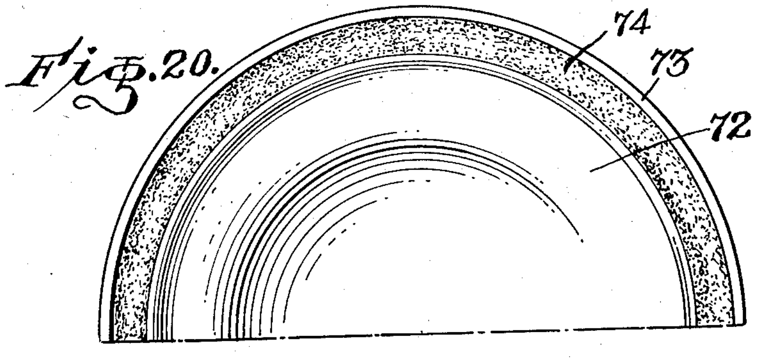

Other and further object of the invention will become apparent from a reading of the following specification taken in conjunction with the drawings, in which:

Figure 1 is a fragmentary vertical sectional view of an embodiment of the invention showing the same mounted upon a container, Figure 2 is an enlarged exploded view similar to Figure 1 showing the device in greater detail, Figure 3 is a bottom plan view of the closure member illustrated in Figures 1 and 2, Figure 4 is a fragmentary bottom plan view, greatly enlarged, illustrating a latching finger forming a part of the invention, Figure 5 is an enlarged fragmentary sectional view illustrating the flexible portion of the device illustrated in Figures 1 to 4, inclusive, mounted in sealing engagement upon the container after the rigid portion of the closure has been discarded, Figure 6 is a vertical sectional view, partly broken away, of another form the invention may assume, Figure 7 is a fragmentary vertical sectional view of a further modified form of the invention showing the same mounted upon a container, Figure 8 is a fragmentary vertical sectional view illustrating another form of the invention, Figure 9 is a fragmentary plan view of still another form the invention may assume, Figure 10 is a fragmentary vertical sectional view of the device illustrated in Figure 9, Figure 11 is a fragmentary vertical sectional view illustrating still another form of the invention, Figure 12 is a view similar to Figure 8 but illustrating still another form of the invention, Figure 13 is a view similar to Figure 12 illustrating another form of the invention, Figure 14 is a fragmentary vertical sectional view illustrating another form of the invention mounted upon a container, Figure 15 is a fragmentary plan view of Figure 14, Figure 16 is a view similar to Figure 14 but illustrating a still further modification of the invention, Figure 17 is a fragmentary plan view of Figure 16, Figure 18 is a vertical sectional view illustrating still another form the invention may assume and illustrating the manner in which the rigid portion thereof may be removed from a container, Figure 19 is a view similar to Figure 18 but illustrating a further modified form the invention may assume, and Figure 20 is a fragmentary bottom plan view of the rigid portion of the closure member illustrated in Figure 19.

Referring more particularly to the drawings, there is shown therein, in Figures 1 to 5, inclusive, a container 10 which may be of glass, plastic material, metal, ceramic, paper or any other suitable material and which is provided at is upper end with an outwardly extending bead 11. The closure device in this instance consists of a rigid member or disc 12, as for example, of metal and of sufficient rigidity to withstand an absolute or partial vacuum within the container 10 without appreciable deflection of the disc 12 and which is provided adjacent its peripheral edge with an upwardly extending circular trough 13 the surface of which is provided with a sealing compound or a gasket 14 which is resilient or rubber-like in consistency. The flexible portion of this form of the invention comprises a disc-shaped body 15 of polyethylene or the like having an upwardly extending peripheral portion 16 with the outer edge of which is integrally formed a dependent skirt 17 the lower end of which is provided with an inwardly extending integrally formed flange 18, the latter having integrally formed therewith a series (in this case three) of circumferentially spaced inwardly extending latch members 19. It will be understood that the flexible member is normally in close contact with the upper surface of the rigid member 12.

In the operation of this form of the invention, it will be understood that the contents of the container 10 are vacuum or hermetically sealed therein in conventional manner by utilizing the body 15, the rigid member 12 and the sealing compound, or gasket 14 for such purpose whereby the rigid member 12 will inherently prevent appreciable deflection of the central portion of body 15 and concomitantly prevent dependent skirt 17 and latch members 19 from disengaging the container so as to attain and retain desired sealing. When it is desired to remove the contents or a portion of the contents of the container 10, it is only necessary to remove the flexible member by means of the fingers since the same may easily be distorted sufficiently to "peel or flex" the same from the container 10 and the rigid member12. The rigid member 12 will remain in position after the flexible member is thus removed. The rigid member may then be pried off the container 10 or punctured to relieve the vacuum therein and, in any event may then be discarded in the usual manner. The user may then replace the flexible member upon the container, as illustrated in Figure 5 and it will be apparent that the flexible member, fitting snugly or as a light press fit, will now seal the interior of the container 10 from outside atmosphere to the extent that transfer of gases, vapors and odors are restricted sufficiently to protect the product in the container, due to the fact that the portion 16 thereof will bear against the upper edge of the lip or bead 11 due to the action of the latch members 19 frictionally bearing against the under portion of the lip or bead 11, thereby drawing portion 16 into contact with the upper edge of lip or bead 11. Thus it will be seen that the flexible portion of this particular form of the invention provides a closure member which may be re-used over and over again after the rigid member has been removed from the container in customary manner. It will also be apparent that the flexible portion of the closure member will act to protect the rigid portion thereof while the device remains upon the container as originally placed thereon, such protection being particularly important during capping, conveying and handling operations.

In Figure 6 there is shown a slightly modified form of the device illustrated in Figures 1 to 5, inclusive, the modification consisting in the provision of an indentation 20 formed in the rigid member 12 and a registering indentation 21 formed in the member 15, such indentations being preferably at the center portions of such members and providing a convenient means for holding the closure member with the thumb or other finger of the hand while the other fingers of the hand are utilized to remove the flexible portion of the closure member from the remainder of the device.

In Figure 7 there is shown a rigid member identical with that shown in Figures 1 to 5, inclusive, with the exception that the same is provided with a centrally disposed aperture 22 as shown but which aperture may be located in any other desired position. The flexible portion of this closure member consists of a body 23 which may be circular and which closely overlies the rigid member 12 and its upwardly extending trough having sealing compound or gasket and which is provided with an integrally formed dependent skirt 24 having an inwardly directed V-shaped bead 25, Integrally formed with the body 23 and dependent therefrom is a generally conical plug 26 having a diameter 27 adjacent its upper end slightly greater than that of the opening 22.

In the operation of the form of the invention illustrated in Figure 7, it will be apparent that the entire closure member is assembled upon the container 10 with the plug 26 already extended through the opening 22 and that not only does the flexible member 23 protect the entire device prior to removal of the rigid portion 12 thereof but that, when it is desired to break the absolute or partial vacuum in the container 10, it is only necessary to "peel or flex" the flexible member 23 from the remainder of the device as aforesaid at which time the plug 26 may be pulled outwardly from the opening 22 to thus allow air to enter the container 10 and thereby release the vacuum whereupon the rigid member 12 may be discarded if desired after which the flexible member may again be utilized over and over again to seal and re-seal the container 10, it being apparent that the upper face of the V-shaped bead will bear against the underside of the bead 11 of the container 10 to thus force the upper face of the bead 11 into contact with the underside of the body 23 of the flexible member.

In Figures 8 to 10, inclusive, there is shown a beadless container 28. The rigid portion of the closure member in this case consists of a rigid member 29 of metal, plastic material or the like which may be circular, as shown, or may be of any other suitable geometrical shape, having a vertically dependent skirt 30 provided with a downwardly and outwardly flaring lower portion 31 whose lower end 32 is crimped inwardly to hold therein an upwardly and inwardly extending rubber gasket 33 the free end of which bears against the outer face of the container 28, as indicated at 34. The flexible portion of this closure member consists of a body 35 shaped to conform with member 29 and having an integrally formed dependent skirt 36 which is provided with an inwardly and downwardly extending lower portion 37 which bears against the outer face of the container 28, as indicated at 38.

In the use of the form of the invention illustrated in Figures 8 to 10, inclusive, as in prior embodiments of this invention, it will be apparent that the device may be placed upon the container 28 as a unit and vacuum sealed thereon in accordance with customary practice. Thereafter, the lower portion 37 of the flexible member may be grasped in the fingers of one hand and removed from the remainder of the device whereupon the rigid member may be removed from the container 28 by means of a can opener or the like, first puncturing the same if desired. The rigid member may then be discarded and the flexible member utilized as indicated in Figure 10 to act as a sealing cover for the container 28, it being apparent that the flexible member will seal at the point 38 as well as between the underside of the body 35 and the upper edge of the container 28 thus leaving a "dead air" space 39 to further insure against contamination of the interior of the container 38.

In the form of the invention illustrated in Figure 11, the construction of the closure member is identical with that described in Figures 8 to 10, inclusive, with the exception that from the contact point 38 the skirt 36 is further provided with a downwardly and outwardly flaring lip 39-*a* which acts to assist in the removal of the flexible portion from the remainder of the device.

In Figure 12 there is shown a container 40 having an outwardly extending bead 41 at its upper edge. The rigid member is provided with a body member 42 which may be circular, as shown, or may be of any other suitable geometrical shape, having an upwardly extending trough 43 in its peripheral edge portion which is adapted to bear against the top of the bead 41. The outer edge of the trough 43 has integrally formed therewith a vertically dependent skirt 44 provided with a downwardly and outwardly extending lower portion 45 which is, in turn, extended inwardly and crimped, as indicated at 46, upon an upwardly and inwardly extending gasket 47 which is adapted to bear against the under portion of the bead 41. The flexible portion of this particular closure member is provided with a body 48, a trough 49 and a dependent skirt 50 which closely overlie the portions 42, 43 and 44 of the rigid member. In addition, the skirt 50 is provided with a downwardly and outwardly extending portion 51 which closely overlies the portion 45 of the rigid member and with a downwardly and inwardly extending portion 52 which terminates in a lip 53 which bears against the outer surface of the container 40. The operation of this form of the invention is substantially the same as that heretofore described with other modifications of the invention.

In Figure 13 there is shown a container 54 which is one of the standard types of containers now on the market and which is provided adjacent its unbeaded upper edge with an annular projection 56 which provides a shoulder 57. The rigid portion of the closure member in this case consists of a body 58 which may be disc-shaped, as shown, or may be of any other suitable geometrical shape, having a dependent skirt 59 whose lower edge 60 is inturned to crimp therein an upwardly and inwardly extending gasket 61 which is adapted to bear against the outer face of the container 54 adjacent the upper edge thereof. The flexible portion of a closure member of this invention which has been found highly satisfactory when used in connection with these types of containers consists of a body 62 shaped to conform with body 58 and having a dependent skirt 63. The body 62 overlies the body 58 and the skirt 63 bears against the skirt 59 and the underside of the shoulder 56 and is provided with a downwardly extending lower portion 64 which may be outwardly flared, as shown, if desired.

In the operation of the device illustrated in Figure 13, it will be apparent that the contents of the container 54 may be vacuum or hermetically sealed as aforesaid and that when it is desired to remove the closure, the flexible portion thereof may be removed by means of the fingers utilizing the downwardly extending portion 64 for such purpose after which the rigid member may be removed with any convenient tool which may be placed upon the shoulder 57 below the crimped portion 60 to thus utilize the shoulder 57 in prying off the rigid portion of the container which may then be punctured if so desired to relieve the vacuum in the container 54. Obviously here again the flexible member may be utililtzed to seal and reseal the jar 54 at any time after the removal of the rigid member.

In the form of the invention illustrated in Figure 18 there is shown a container 65 having an unbeaded upper edge and the closure member in this case consists of a flexible member having a body 66 which may be circular, as shown, or may be of any other suitable geometrical shape, and a dependent skirt 67 provided with an annular inwardly extending substantially V-shaped bead or member 68, as shown, or other configuration which is adapted to frictionally bear against the outer face of the container 65. The rigid member in this case is placed over the flexible member and preferably consists of a metallic body 69 overlying the body 66 and a vertically dependent skirt 70 which overlies the outer face of the skirt 67.

In the operation of this form of this invention, it will be apparent that when it is desired to break the vacuum in the container 65, it is only necessary to utilize a tool such as is indicated at 71 or any other convenient tool such as a can opener, for example, to remove the rigid member from its position upon the flexible member 66. This will ordinarily break the vacuum during such removal of the rigid member. If not, the flexible member may easily be removed with the fingers and it will, of course, be apparent that the flexible member may be reused over and over again to seal and re-seal the jar 65 since the member 68 bears against the outer face of the container while the underside of the body 66 bears against the upper edge of the container.

In the form of the invention illustrated in Figures 19 and 20, there is shown as a rigid member a standard lid for so-called Mason jars and the like and which is presently known in the trade as "Arc-Lid" and which is provided with a dome-shaped body 72 having an upwardly extending annular trough 73 in its peripheral edge portion which trough is provided with a gasket or a coating composition at 74. A container 75 adapted to receive the lid in this case is provided with a rounded upper edge 76 which is adapted to be received in the trough 73. In the packing operation, the vacuum or hermetic seal formed within the container 75 causes the dome 72 to move downwardly with a sharp report thus indicating to the user that the packing operation has been completed. The flexible member in this case is provided with a circular body 77 and a flexible dependent skirt 78 which overlies and bears against the outer face of the upper portion of the container 75.

In Figures 14 and 15 there is shown a contanier 79 having an outwardly beaded upper edge 80. The closure in this case consists of a circular disc-shaped metallic member 81 whose peripheral portion is embedded in the inner edge of a ring 82 of flexible material whose underside is provided with a sealing compound 83 and which is provided with a vertically dependent skirt 84 having an inwardly directed annular bead 85. In this form of the invention the jar 79 may be vacuum or hermetically sealed utilizing the present closure, the rigid member 81 providing the necessary strength to maintain such vacuum and it will be apparent that when it is desired to open the container 79, the entire closure may be removed from the container by using the fingers with the lower edge of the skirt 84. It will also be apparent that the device may be reused at any time since the bead 85 bears against the lower portion of the bead 80 to thus force the sealing compound or gasket 83 against the upper edge of the jar 79, thus permitting reuse of the device even after the vacuum has been broken. No substantial distortion is caused to the rigid member 81 since only the flexible ring 82 and its dependent skirt 84 are utilized in mounting or removing the closure in this case.

In the form of the invention illustrated in Figures 16 and 17, there is shown a container 86 having an outwardly extending bead 87 at its upward edge. The closure member in this case consists of a circular disc 88 of metal or similar substantially rigid material having a shoulder 89 formed or undercut in its peripheral portion. A ring 90 of flexible material completes the present device and is provided with an inwardly extending flange 91 which fits within the undercut portion 89 and bears against the top of bead or lip 87. A dependent skirt 92 is formed integrally with the ring 90 and is provided with a V-shaped inwardly extending annular bead 93 adjacent its lower end. The member 88 may be upwardly and inwardly beveled, as indicated at 94, but may be otherwise shaped to anchor it into the flexible portion, and the ring 90 is shaped to receive the same so that the rigid and flexible portions of the instant cover may be hadled as a unit.

In operation, the device illustrated in Figures 16 and 17 may be placed as a unit upon the container 86 and the contents of the container may be vacuum or hermetically sealed therein, the rigid member 88 providing the necessary strength and rigidity to withstand the vacuum and a seal being formed by the flange 91 between the outer portion of the rigid member 88 and the upper end of the bead 87 and the entire device being maintained in position by the bead 93 bearing against the underside of the bead 87. Here again, the device may be removed as a unit without distorting the rigid member 88 by utilizing the fingers in conjunction with the lower end of the skirt 92 and it will also be apparent that this device is also capable of reuse after the vacuum has been broken.

While certain forms of the invention have been shown and described herein, it will be readily apparent to those skilled in the art that many modifications and alterations may be made without departing from the spirit of the invention or the scope of the appended claims.

What is claimed is:

1. A closure member for open-topped containers consisting essentially of a rigid member having a sealing surface mounted upon the upper edge of said container and in sealing engagement therewith, a flexible member constructed to cover the open top of said container and overlying said rigid member and having a dependent skirt formed integrally with said flexible member, said skirt having inwardly directed circumferentially spaced latch members engageable with said container for sealing said flexible member upon said container.

2. A device as defined in claim 1 wherein said rigid member and said flexible member are individually removable from said container and are provided with a depressed portion, said portions being in vertical registry.

3. In combination with an open-topped container having an outwardly projecting lip, a rigid member having an upwardly extending annular trough in its peripheral portion, a sealing material in said trough, said lip having its upper portion receivable in said trough and adapted to bear against said sealing material, a flexible member superposed upon said rigid member, a dependent skirt formed integrally with said flexible member and a series of inwardly directed circumferentially spaced latch members engageable with the under portion of said lip.

4. A closure member for an open-topped container comprising a rigid member having a perimeter greater than the smallest inner perimeter formed by the inner components of said closure, a sealing member integral with one side of said rigid member and sealingly engaged with the open top of said container, a flexible member superposed upon said rigid member and having a dependent skirt formed integrally with said flexible member, said flexible member being disengageable from said container for removal thereof separately from said rigid member, and said skirt having inwardly directed circumferentially spaced latch members engageable with said container for sealing said flexible member with said container.

5. In combination with an open-topped container, a rigid member having a sealing surface forming an integral portion thereof engaging with the open top of said container, a flexible member including a central portion proportioned to cover the open top of said container separable from said rigid member, and a dependent skirt formed integrally with said flexible member, said skirt having inwardly directed circumferentially spaced latch members engaging with said container for sealing said flexible member with said container.

References Cited in the file of this patent

UNITED STATES PATENTS

| | | |
|---|---|---|
| 1,134,890 | Morgan | Apr. 6, 1915 |
| 1,360,388 | Gaynor | Nov. 30, 1920 |
| 1,647,892 | Viebrock | Nov. 1, 1927 |
| 1,857,853 | McMann | May 10, 1932 |